(12) United States Patent
Zhang et al.

(10) Patent No.: US 11,032,856 B2
(45) Date of Patent: Jun. 8, 2021

(54) DATA TRANSMISSION METHOD AND APPARATUS

(71) Applicant: Huawei Technologies Co., Ltd., Shenzhen (CN)

(72) Inventors: Hongping Zhang, Shanghai (CN); Qinghai Zeng, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/365,332

(22) Filed: Mar. 26, 2019

(65) Prior Publication Data

US 2019/0223230 A1    Jul. 18, 2019

Related U.S. Application Data

(63) Continuation of application No. PCT/CN2017/103507, filed on Sep. 26, 2017.

(30) Foreign Application Priority Data

Sep. 27, 2016  (CN) .......................... 201610856299.X

(51) Int. Cl.
*H04W 76/10* (2018.01)
*H04W 48/10* (2009.01)
(Continued)

(52) U.S. Cl.
CPC .......... *H04W 76/10* (2018.02); *H04W 48/08* (2013.01); *H04W 48/10* (2013.01); *H04W 48/16* (2013.01);
(Continued)

(58) Field of Classification Search
CPC ..... H04W 76/10; H04W 76/12; H04W 48/08; H04W 48/16; H04W 72/04; H04W 48/10;
(Continued)

(56) References Cited

U.S. PATENT DOCUMENTS

2007/0133456 A1    6/2007  Ding
2013/0044708 A1    2/2013  Kim et al.
(Continued)

FOREIGN PATENT DOCUMENTS

CN         1794827 A      6/2006
CN       103580778 A      2/2014
(Continued)

OTHER PUBLICATIONS

3GPP TS 36.331 V11.16.0, 3rd Generation Partnership Project; Technical Specification Group Radio Access Network; Evolved Universal Terrestrial Radio Access (E-UTRA); Radio Resource Control (RRC); Protocol specification (Release 11), Jun. 2016, 360 pages, XP051123196.

*Primary Examiner* — Ivan O Latorre
(74) *Attorney, Agent, or Firm* — Slater Matsil, LLP

(57) ABSTRACT

A method includes determining configuration information of a preset data bearer, where the preset data bearer is used to transmit data, and the configuration information comprises a data transmission mode of data transmitted over a radio interface through the preset data bearer. The method also includes sending the configuration information of the preset data bearer to a mobile terminal before establishment of a radio resource control (RRC) connection to the mobile terminal is completed, where the configuration information of the preset data bearer is used by the mobile terminal to transmit data through the preset data bearer.

14 Claims, 9 Drawing Sheets

(51) Int. Cl.
*H04W 72/04* (2009.01)
*H04W 48/16* (2009.01)
*H04W 48/08* (2009.01)
*H04W 76/12* (2018.01)
*H04L 29/06* (2006.01)
*H04W 92/04* (2009.01)
*H04W 12/03* (2021.01)

(52) U.S. Cl.
CPC ........... *H04W 72/04* (2013.01); *H04W 76/12* (2018.02); *H04L 63/04* (2013.01); *H04W 12/03* (2021.01); *H04W 92/045* (2013.01)

(58) Field of Classification Search
CPC . H04W 92/045; H04W 12/001; H04W 28/18; H04L 63/04
See application file for complete search history.

(56) References Cited

U.S. PATENT DOCUMENTS

| | | | | |
|---|---|---|---|---|
| 2013/0201924 A1* | 8/2013 | Song | ...................... | H04W 76/10 370/329 |
| 2014/0003233 A1* | 1/2014 | Rune | .................. | H04W 28/085 370/230 |
| 2014/0187165 A1 | 7/2014 | Wu et al. | | |
| 2014/0242970 A1* | 8/2014 | Yu | ........................... | H04W 8/24 455/419 |
| 2014/0362775 A1* | 12/2014 | Steiner | ................ | G06F 9/45558 370/329 |
| 2015/0133141 A1 | 5/2015 | Song et al. | | |
| 2015/0264562 A1 | 9/2015 | Wu | | |
| 2015/0264631 A1 | 9/2015 | Zhang et al. | | |
| 2016/0135166 A1* | 5/2016 | Cilli | ........................ | H04W 8/10 370/329 |
| 2016/0198390 A1 | 7/2016 | Aminaka et al. | | |
| 2018/0027479 A1* | 1/2018 | Ahmad | ................. | H04W 48/12 370/235 |
| 2019/0014465 A1* | 1/2019 | Wang | ...................... | H04W 8/26 |
| 2019/0253918 A1* | 8/2019 | Liu | ...................... | H04W 40/06 |
| 2020/0029244 A1* | 1/2020 | Jiang | ...................... | H04L 47/32 |

FOREIGN PATENT DOCUMENTS

| | | |
|---|---|---|
| CN | 103716885 A | 4/2014 |
| CN | 103796287 A | 5/2014 |
| CN | 104885517 A | 9/2015 |
| CN | 105163403 A | 12/2015 |
| GB | 2431071 A | 4/2007 |

* cited by examiner

DATA TRANSMISSION METHOD AND APPARATUS

CROSS-REFERENCE TO RELATED APPLICATIONS

This application is a continuation of International Application No. PCT/CN2017/103507, filed on Sep. 26, 2017, which claims priority to Chinese Patent Application No. 201610856299.X, filed on Sep. 27, 2016. The disclosures of the aforementioned applications are hereby incorporated by reference in their entireties.

TECHNICAL FIELD

This application relates to the field of communications technologies, and in particular, to a data transmission method and apparatus.

BACKGROUND

With fast development of communications technologies, a Long Term Evolution (LTE) network has been widely applied. In the LTE network, a mobile terminal may establish a data bearer (DRB) with a radio access network device (for example, a base station) to perform data transmission.

Currently, during data transmission, before a DRB is established between the mobile terminal and the radio access network device, the following process usually further needs to take place: A radio resource control (RRC) connection is established between the mobile terminal and the radio access network device. After the RRC connection is successfully established, the radio access network device sends a connection establishment request to a core network device. After receiving the connection establishment request, the core network device sends a connection establishment response to the radio access network device. After receiving the connection establishment response, the radio access network device establishes a connection to the core network device through an S1 interface. Subsequently, the radio access network device initiates a security activation process (including encryption and integrity protection) by using an initial security activation process. The radio access network device initiates a DRB establishment process after the security activation process is started.

It can be learned that in the data transmission method provided in the foregoing, a plurality of signaling interactions are required before a DRB can be established between the mobile terminal and the radio access network device, and data transmission is performed based on the DRB, resulting in relatively a long data transmission latency.

SUMMARY

To resolve the problem in the prior art, embodiments of this application provide a data transmission method and apparatus. The technical solutions are as follows.

According to a first aspect, a data transmission method is provided. The method is applied to a radio access network device. The method includes determining configuration information of a preset data bearer, where the preset data bearer is used to transmit data, and the configuration information includes a data transmission mode of data transmitted over a radio interface through the preset data bearer. The method also includes sending the configuration information of the preset data bearer to a mobile terminal before establishment of a radio resource control (RRC) connection to the mobile terminal is completed, where the configuration information of the preset data bearer is used by the mobile terminal to transmit data through the preset data bearer.

The preset data bearer may belong to each cell or base station. To be specific, each mobile terminal in a cell or a base station may use the preset data bearer configured by the cell or the base station. Therefore, in a possible implementation, the preset data bearer may also be referred to as a cell data bearer.

A bearer establishment instruction may instruct to establish a plurality of preset bearers. The radio access network device may generate configuration information of one or more preset data bearers based on the bearer establishment instruction.

In the embodiments of this application, before the RRC connection is established, the configuration information that is used to transmit data and that is of the preset data bearer is sent to the mobile terminal. In this case, after the RRC connection is established, the mobile terminal can transmit data through the preset data bearer based on the configuration information, thereby avoiding that a plurality of signaling interactions are required before data transmission can be started, so that a data transmission latency is reduced.

With reference to the first aspect, in a first possible implementation, the configuration information of the preset data bearer includes at least one of a preset data bearer identifier, logic channel information, Radio Link Control (RLC) configuration information, and packet data convergence protocol (PDCP) configuration information.

In the embodiments of this application, based on the configuration information, the mobile terminal can implement data transmission through the preset data bearer.

With reference to the first aspect and the first possible implementation of the first aspect, in a second implementation, the configuration information of the preset data bearer includes use condition information and/or a first mapping relationship, the use condition information is used to indicate a condition that needs to be met by a mobile terminal that can use the preset data bearer, and the first mapping relationship is a mapping relationship between a data type and a data bearer supporting the data type.

In a possible implementation, the use condition information and/or the first mapping relationship may be added by a core network device to the bearer establishment instruction. In another possible implementation, the use condition information and/or the first mapping relationship may alternatively be automatically generated by the radio access network device based on QoS.

In the embodiments of this application, when the preset data bearer includes the use condition information, a mobile terminal that uses the preset data bearer may be restricted. When the preset data bearer includes the first mapping relationship, the mobile terminal can determine which data can be transmitted through the preset data bearer.

With reference to the first aspect or any foregoing possible implementation of the first aspect, in a third possible implementation, the sending the configuration information of the preset data bearer to a mobile terminal before establishment of a radio resource control (RRC) connection to the mobile terminal is completed includes: broadcasting system information, where the system information includes the configuration information of the preset data bearer; or during the establishment of the RRC connection, adding the configuration information of the preset data bearer to a specified message sent to the mobile terminal.

The configuration information of the preset data bearer is sent to the mobile terminal in different manners, so that there are more manners of sending the configuration information.

With reference to the first aspect or any foregoing possible implementation of the first aspect, in a fourth possible implementation, the specified message is a radio resource control RRC establishment message.

In this way, during the establishment of the RRC connection, the RRC establishment message may be used to send the configuration information of the preset data bearer to the mobile terminal. In this way, signaling interactions can be reduced.

With reference to the first aspect or any foregoing possible implementation of the first aspect, in a fifth possible implementation, the method further includes: after the establishment of the RRC connection to the mobile terminal is completed, receiving data sent through the preset data bearer by the mobile terminal.

In the embodiments of this application, after the establishment of the RRC connection to the mobile terminal is completed, it may be considered by default that the establishment of the preset data bearer is completed. Therefore, the mobile terminal may transmit data through the preset data bearer. Correspondingly, the radio access network device can receive the data.

With reference to the first aspect or any foregoing possible implementation of the first aspect, in a sixth possible implementation, the configuration information of the preset data bearer includes an encryption instruction, and the encryption instruction is used to instruct the mobile terminal to perform encryption processing on data that needs to be transmitted.

In the embodiments of this application, the encryption instruction may further be included in the configuration information, to implement encryption of data, thereby improving security of data transmission.

With reference to the first aspect or any foregoing possible implementation of the first aspect, in a seventh possible implementation, the configuration information of the preset data bearer further includes a security algorithm identifier, and the security algorithm identifier is used to instruct the mobile terminal to perform, based on a security algorithm corresponding to the security algorithm identifier, encryption processing on the data that needs to be transmitted.

In the embodiments of this application, the security algorithm identifier may further be included in the configuration information. In this way, the mobile terminal is instructed to use the security algorithm corresponding to the security algorithm identifier to perform encryption processing on the data that needs to be transmitted, thereby further improving encryption security.

With reference to the first aspect or any foregoing possible implementation of the first aspect, in an eighth possible implementation, the configuration information of the preset data bearer further includes capacity indication information, and the capacity indication information is used to indicate a maximum amount of uplink data that the mobile terminal is allowed to upload.

In the embodiments of this application, an amount of uplink data uploaded by the mobile terminal may further be restricted, thereby avoiding that an amount of data uploaded by the mobile terminal exceeds a caching capability of the radio access network device.

With reference to the first aspect or any foregoing possible implementation of the first aspect, in a ninth possible implementation, the method further includes: after the RRC connection to the mobile terminal is established, sending RRC signaling carrying specified configuration information to the mobile terminal, where the RRC signaling is used to instruct the mobile terminal to change the configuration information of the preset data bearer to the specified configuration information.

In this way, during data transmission, the RRC signaling may be used to carry the specified configuration information according to an actual requirement, to change the configuration information of the preset data bearer, and reduce signaling interactions.

According to a second aspect, a data transmission method is provided. The method is applied to a mobile terminal. The method includes: before establishment of a radio resource control (RRC) connection to a radio access network device is completed, receiving configuration information that is sent by the radio access network device and that is of a preset data bearer, where the preset data bearer is used to transmit data, and the configuration information includes a data transmission mode of data transmitted over a radio interface through the preset data bearer and is used to instruct to transmit data through the preset data bearer. The method also includes, after the establishment of the RRC connection to the radio access network device is completed, transmitting data through the preset data bearer based on the configuration information of the preset data bearer.

In the embodiments of this application, after the mobile terminal receives the configuration information and completes the establishment of the RRC connection to the radio access network device, data can be transmitted through the preset data bearer based on the configuration information, thereby avoiding that a plurality of signaling interactions are required before data transmission can be started, so that a data transmission latency is reduced.

With reference to the second aspect, in a first possible implementation, the configuration information of the preset data bearer includes at least one of a preset data bearer identifier, logic channel information, Radio Link Control (RLC) configuration information, and packet data convergence protocol (PDCP) configuration information.

In the embodiments of this application, based on the configuration information, the mobile terminal can implement data transmission through the preset data bearer.

With reference to the second aspect or the first possible implementation of the second aspect, in a second possible implementation, before the transmitting data through the preset data bearer based on the configuration information of the preset data bearer, the method further includes: when the configuration information of the preset data bearer includes use condition information, determining whether a condition indicated in the use condition information is met, where the use condition information is used to indicate a condition that needs to be met by a mobile terminal that can use the preset data bearer; and when the condition indicated in the use condition information is met, performing the step of transmitting data through the preset data bearer based on the configuration information of the preset data bearer.

In this way, if the configuration information includes use condition information, before data transmission, the mobile terminal needs to determine whether the mobile terminal meets the condition indicated in the use condition information, and the mobile terminal can transmit data through the preset data bearer only when the condition indicated in the use condition information is met.

With reference to the second aspect or the first possible implementation of the second aspect, in a third possible implementation, before the transmitting data through the preset data bearer based on the configuration information of the preset data bearer, the method further includes: when the configuration information of the preset data bearer includes a first mapping relationship, determining a data type of the data, where the first mapping relationship is a mapping relationship between a data type and a data bearer supporting the data type; determining, based on the first mapping relationship, whether a data bearer corresponding to the data type of the data is the preset data bearer; and when the data bearer corresponding to the data type of the data is the preset data bearer, performing the step of transmitting data through the preset data bearer based on the configuration information of the preset data bearer.

In the embodiments of this application, if the configuration information includes the first mapping relationship, before data transmission, it needs to be determined whether data that needs to be transmitted may be transmitted through the preset data bearer. The mobile terminal can transmit the data through the preset data bearer based on the configuration information only when a data type of the data that needs to be transmitted is a data type corresponding to the preset data bearer. Otherwise, the mobile terminal cannot transmit the data through the preset data bearer based on the configuration information.

With reference to the second aspect or the first possible implementation of the second aspect, in a fourth possible implementation, the receiving configuration information that is sent by the radio access network device and that is of a preset data bearer includes: receiving system information broadcast by the radio access network device, where the system information includes the configuration information of the preset data bearer; or during the establishment of the RRC connection, receiving a specified message sent by the radio access network device, where the specified message carries the configuration information of the preset data bearer.

Different technical measures are used by the radio access network device to send the configuration information to the mobile terminal in the foregoing. Correspondingly, the mobile terminal obtains the configuration information in different manners.

With reference to the second aspect or the first possible implementation of the second aspect, in a fifth possible implementation, the specified message is a radio resource control (RRC) establishment message.

In this way, during the establishment of the RRC connection, the configuration information of the preset data bearer may be received by using the RRC establishment message. In this way, signaling interactions can be reduced.

With reference to the second aspect or the first possible implementation of the second aspect, in a sixth possible implementation, the method further includes: when the configuration information of the preset data bearer includes an encryption instruction, performing encryption processing on data that needs to be transmitted.

In the embodiments of this application, the encryption instruction may further be included in the configuration information, to implement encryption of data, thereby improving security of data transmission.

With reference to the second aspect or the first possible implementation of the second aspect, in a seventh possible implementation, the method further includes: when configuration information of the preset data bearer includes a security algorithm identifier, performing, based on a security algorithm corresponding to the security algorithm identifier, encryption processing on the data that needs to be transmitted.

In the embodiments of this application, the security algorithm identifier may further be included in the configuration information. In this way, the mobile terminal is instructed to use the security algorithm corresponding to the security algorithm identifier to perform encryption processing on the data that needs to be transmitted, thereby further improving encryption security.

With reference to the second aspect or the first possible implementation of the second aspect, in an eighth possible implementation, before the transmitting data through the preset data bearer based on the configuration information of the preset data bearer, the method further includes: when the configuration information of the preset data bearer includes capacity indication information, determining whether a size of data that has been transmitted over the preset data bearer is greater than a maximum amount that is indicated in the capacity indication information and that is of uplink data; and when the size of data that has been transmitted over the preset data bearer is greater than the maximum amount that is indicated in the capacity indication information and that is of uplink data, stopping performing the step of transmitting data through the preset data bearer based on the configuration information of the preset data bearer.

In the embodiments of this application, an amount of uplink data uploaded by the mobile terminal may further be restricted, thereby avoiding that an amount of data uploaded by the mobile terminal exceeds a caching capability of the radio access network device.

With reference to the second aspect or the first possible implementation of the second aspect, in a ninth possible implementation, the method further includes: after the establishment of the RRC connection to the radio access network device is completed, receiving RRC signaling that is sent by the radio access network device and that carries specified configuration information; and changing the configuration information of the preset data bearer to the specified configuration information.

In this way, during data transmission, the RRC signaling may be used to carry the specified configuration information according to an actual requirement, to change the configuration information of the preset data bearer, and reduce signaling interactions.

According to a third aspect, a data transmission apparatus is provided. The apparatus includes a determining module, configured to determine configuration information of a preset data bearer, where the preset data bearer is used to transmit data, and the configuration information includes a data transmission mode of data transmitted over a radio interface through the preset data bearer. The apparatus also includes a first sending module, configured to send the configuration information that is determined by the determining module and that is of the preset data bearer to a mobile terminal before establishment of a radio resource control (RRC) connection to the mobile terminal is completed, where the configuration information of the preset data bearer is used by the mobile terminal to transmit data through the preset data bearer.

With reference to the third aspect, in a first possible implementation, the configuration information of the preset data bearer includes at least one of a preset data bearer identifier, logic channel information, Radio Link Control (RLC) configuration information, and packet data convergence protocol (PDCP) configuration information.

With reference to the third aspect or the first possible implementation of the third aspect, in a second possible implementation, the configuration information of the preset data bearer includes use condition information and/or a first mapping relationship, the use condition information is used to indicate a condition that needs to be met by a mobile terminal that can use the preset data bearer, and the first mapping relationship is a mapping relationship between a data type and a data bearer supporting the data type.

With reference to the third aspect or any foregoing possible implementation of the third aspect, in a third possible implementation, the apparatus further includes: a broadcast module, configured to broadcast system information, where the system information includes the configuration information of the preset data bearer; and a second sending module, configured to: during the establishment of the RRC connection, add the configuration information of the preset data bearer to a specified message sent to the mobile terminal.

With reference to the third aspect or any foregoing possible implementation of the third aspect, in a fourth possible implementation, the specified message is a radio resource control RRC establishment message.

With reference to the third aspect or any foregoing possible implementation of the third aspect, in a fifth possible implementation, the apparatus further includes: a receiving module, configured to: after the establishment of the RRC connection to the mobile terminal is completed, receive data sent through the preset data bearer by the mobile terminal.

With reference to the third aspect or any foregoing possible implementation of the third aspect, in a sixth possible implementation, the configuration information of the preset data bearer includes an encryption instruction, and the encryption instruction is used to instruct the mobile terminal to perform encryption processing on data that needs to be transmitted.

With reference to the third aspect or any foregoing possible implementation of the third aspect, in a seventh possible implementation, the configuration information of the preset data bearer further includes a security algorithm identifier, and the security algorithm identifier is used to instruct the mobile terminal to perform, based on a security algorithm corresponding to the security algorithm identifier, encryption processing on the data that needs to be transmitted.

With reference to the third aspect or any foregoing possible implementation of the third aspect, in an eighth possible implementation, the configuration information of the preset data bearer further includes capacity indication information, and the capacity indication information is used to indicate a maximum amount of uplink data that the mobile terminal is allowed to upload.

With reference to the third aspect or any foregoing possible implementation of the third aspect, in a ninth possible implementation, the apparatus further includes: a third sending module, configured to: after the RRC connection to the mobile terminal is established, send RRC signaling carrying specified configuration information to the mobile terminal, where the RRC signaling is used to instruct the mobile terminal to change the configuration information of the preset data bearer to the specified configuration information.

According to a fourth aspect, a data transmission apparatus is provided. The apparatus includes: a first receiving module, configured to: before establishment of a radio resource control RRC connection to a radio access network device is completed, receive configuration information that is sent by the radio access network device and that is of a preset data bearer, where the preset data bearer is used to transmit data, and the configuration information includes a data transmission mode of data transmitted over a radio interface through the preset data bearer and is used to instruct to transmit data through the preset data bearer. The apparatus also includes a transmission module, configured to: after the establishment of the RRC connection to the radio access network device is completed, transmit, based on the configuration information that is received by the first receiving module and that is of the preset data bearer, data through the preset data bearer.

With reference to the fourth aspect, in a first possible implementation, the configuration information of the preset data bearer includes at least one of a preset data bearer identifier, logic channel information, Radio Link Control (RLC) configuration information, and packet data convergence protocol (PDCP) configuration information.

With reference to the fourth aspect or the first possible implementation of the fourth aspect, in a second possible implementation, the apparatus further includes: a first determining module, configured to: when the configuration information of the preset data bearer includes use condition information, determine whether a condition indicated in the use condition information is met, where the use condition information is used to indicate a condition that needs to be met by a mobile terminal that can use the preset data bearer; and a first triggering module, configured to: when the condition indicated in the use condition information is met, trigger the transmission module to perform the step of transmitting data through the preset data bearer based on the configuration information of the preset data bearer.

With reference to the fourth aspect or the second possible implementation of the fourth aspect, in a third possible implementation, the apparatus further includes: a determining module, configured to: when the configuration information of the preset data bearer includes a first mapping relationship, determine a data type of the data, where the first mapping relationship is a mapping relationship between a data type and a data bearer supporting the data type; a second determining module, configured to determine, based on the first mapping relationship, whether a data bearer corresponding to the data type of the data is the preset data bearer; and a second triggering module, configured to: when the data bearer corresponding to the data type of the data is the preset data bearer, trigger the transmission module to perform the step of transmitting data through the preset data bearer based on the configuration information of the preset data bearer.

With reference to the fourth aspect or the second possible implementation of the fourth aspect, in a fourth possible implementation, the first receiving module includes: a first receiving unit, configured to receive system information broadcast by the radio access network device, where the system information includes the configuration information of the preset data bearer; and a second receiving unit, configured to: during the establishment of the RRC connection, receive a specified message sent by the radio access network device, where the specified message carries the configuration information of the preset data bearer.

With reference to the fourth aspect or the second possible implementation of the fourth aspect, in a fifth possible implementation, the specified message is a radio resource control RRC establishment message.

With reference to the fourth aspect or the second possible implementation of the fourth aspect, in a sixth possible implementation, the apparatus further includes: an encryption module, configured to: when the configuration information of the preset data bearer includes an encryption instruction, perform encryption processing on data that needs to be transmitted.

With reference to the fourth aspect or the second possible implementation of the fourth aspect, in a seventh possible implementation, the encryption module is further configured to: when the configuration information of the preset data bearer includes a security algorithm identifier, perform, based on a security algorithm corresponding to the security algorithm identifier, encryption processing on the data that needs to be transmitted.

With reference to the fourth aspect or the second possible implementation of the fourth aspect, in an eighth possible implementation, the method further includes: a third determining module, configured to: when the configuration information of the preset data bearer includes capacity indication information, determine whether a size of data that has been transmitted over the preset data bearer is greater than a maximum amount that is indicated in the capacity indication information and that is of uplink data; and a third triggering module, configured to: when the size of data that has been transmitted over the preset data bearer is greater than the maximum amount that is indicated in the capacity indication information and that is of uplink data, trigger the transmission module to stop performing the step of transmitting data through the preset data bearer based on the configuration information of the preset data bearer.

With reference to the fourth aspect or the second possible implementation of the fourth aspect, in a ninth possible implementation, the apparatus further includes: a second receiving module, configured to: after the establishment of the RRC connection to the radio access network device is completed, receive RRC signaling that is sent by the radio access network device and that carries specified configuration information; and a change module, configured to change the configuration information of the preset data bearer to the specified configuration information.

According to a fifth aspect, a radio access network device is provided. The radio access network device includes a transmitter, a receiver, a memory, and a processor, the memory, the transmitter, and the receiver are connected to the processor, the memory stores program code, and the processor is used to invoke the program code to perform the foregoing method in the first aspect.

According to a sixth aspect, a mobile terminal is provided. The mobile terminal includes a transmitter, a receiver, a memory, and a processor, the memory, the transmitter, and the receiver are connected to the processor, the memory stores program code, and the processor is used to invoke the program code to perform the foregoing method in the second aspect.

According to a seventh aspect, an embodiment of this application provides a computer storage medium, configured to store a computer software instruction used by the foregoing data transmission apparatus, or store a program designed for the data transmission apparatus in the third aspect and the fourth aspect in the foregoing.

An embodiment of this application further provides a communications chip, applied to a radio access network device, where the communications chip includes an input/output interface, a memory, and at least one processor, the memory and the input/output interface communicate with the at least one processor by using the bus, the memory stores program code, and the at least one processor is configured to invoke the program code, so that the radio access network device performs the foregoing method in the first aspect.

An embodiment of this application further provides a communications chip, applied to a mobile terminal, where the communications chip includes an input/output interface, a memory, and at least one processor, the memory and the input/output interface communicate with the at least one processor by using the bus, the memory stores program code, and the at least one processor is configured to invoke the program code, so that the mobile terminal performs the foregoing method in the second aspect.

The technical effects obtained by the third aspect to the sixth aspect in the foregoing embodiments of this application are similar to the technical effects obtained by corresponding technical measures in the first aspect and the second aspect. Details are not described herein again.

The beneficial effects produced by the technical solutions provided in the embodiments of this application are as follows: The configuration information that may be used to transmit data and that is of the preset data bearer is determined, and the configuration information is sent to the mobile terminal before the establishment of the radio resource control RRC connection to the mobile terminal is completed. Because the configuration information includes the data transmission mode of data transmitted over the radio interface through the preset data bearer, after receiving the configuration information, the mobile terminal can transmit data through the preset data bearer based on the configuration information. In this way, after the establishment of the RRC connection is completed, the mobile terminal can use the preset data bearer to transmit data, thereby avoiding that a plurality of signaling interactions are required before a data bearer can be established, so that a data transmission latency is reduced.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DETAILED DESCRIPTION OF ILLUSTRATIVE EMBODIMENTS

To make the objectives, technical solutions, and advantages of this application clearer, the following further describes the implementations of this application in detail with reference to the accompanying drawings.

Figure 1A:
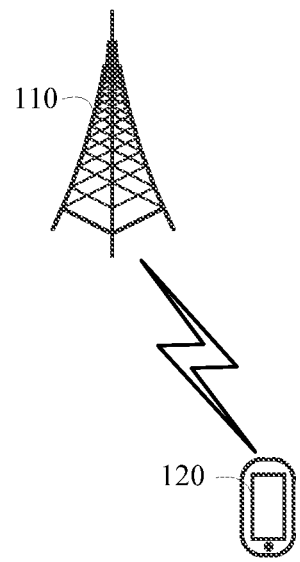
FIG. 1A is a schematic diagram of an implementation environment according to an example of an embodiment.

FIG. 1A is a schematic diagram of an implementation environment according to an example of an embodiment. The implementation environment mainly includes a radio access network device 110 and a mobile terminal 120. The radio access network device 110 may be configured to provide a wireless network. The mobile terminal 120 establishes a communication connection to the radio access network device 110 by using the wireless network. The radio access network device 110 may be a base station or the like. The mobile terminal 120 may be, for example, a device such as a mobile phone.

Figure 1B:
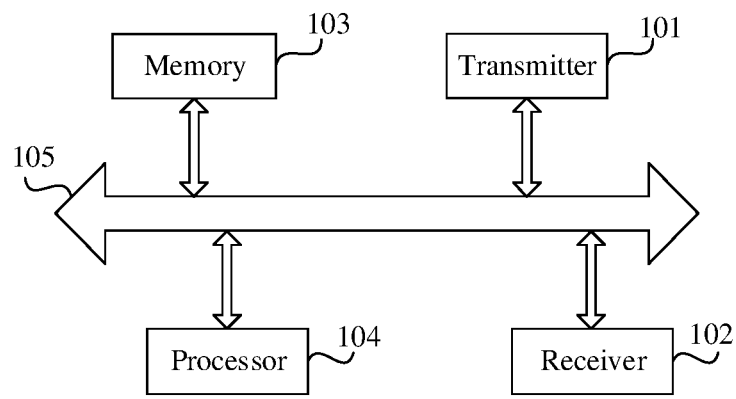
FIG. 1B is a schematic structural diagram of a radio access network device 110 according to an example of an embodiment.

FIG. 1B is a schematic structural diagram of a radio access network device 110 according to an example of an embodiment. The radio access network device 110 mainly includes a transmitter 101, a receiver 102, a memory 103, a processor 104, and a communications bus 105. A person skilled in the art may understand that the structure of the radio access network device 110 shown in FIG. 1B does not constitute a limitation to the radio access network device 110, and may include more or fewer components than those shown in the figure, or combine some components, or have different component arrangements. This is not limited in this embodiment of this application.

The transmitter 101 may be configured to send data, signaling, and/or the like to a mobile terminal 120, or the transmitter 101 is configured to broadcast system information. The receiver 102 may be configured to receive data, signaling, and/or the like sent by the mobile terminal 120. The memory 103 may be configured to store data sent by the mobile terminal 120. In addition, the memory 103 may alternatively be configured to store one or more running programs and/or modules configured to perform the data transmission method.

The processor 104 is a control center of the radio access network device no. The processor 104 may be a general-purpose central processing unit (CPU), a microprocessor, an application-specific integrated circuit (ASIC), or one or more integrated circuits configured to control execution of programs in solutions in this application. The processor 104 may run or execute the software program and/or module stored in the memory 103 and invoke the data stored in the memory 103 to implement a data transmission method provided in the following the embodiment in FIG. 2A.

The communications bus 105 may include a channel for information transfer between the processor 104 and the memory 103.

Figure 1C:
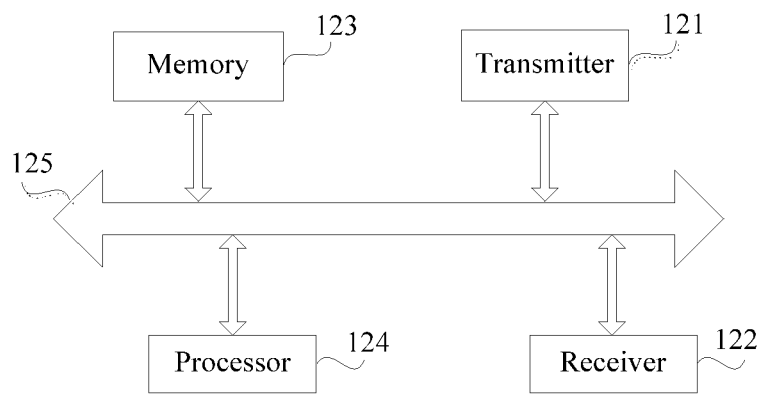
FIG. 1C is a schematic structural diagram of a mobile terminal 120 according to an example of an embodiment.

FIG. 1C is a schematic structural diagram of a mobile terminal 120 according to an example of an embodiment. The mobile terminal 120 mainly includes a transmitter 121, a receiver 122, a processor 124 having one or more processing cores, a memory 123 including one or more computer readable storage media, a communications bus 125, and the like. A person skilled in the art may understand that the structure of the mobile terminal shown in FIG. 1C does not constitute a limitation to the mobile terminal, and may include more or fewer components than those shown in the figure, or combine some components, or have different component arrangements. This is not limited in this embodiment of this application.

The transmitter 121 may be configured to send data, signaling, and/or the like to a radio access network device no. The receiver 122 may be configured to receive data, signaling, and/or the like sent by the radio access network device 110.

The processor 124 is a control center of the mobile terminal 120. The processor 124 may be a general-purpose CPU, a microprocessor ASIC, or one or more integrated circuits configured to control execution of programs in solutions in this application. The processor 124 may run or execute a software program and/or module stored in the memory 123 and invoke data stored in the memory 123 to implement the data transmission method provided in the following the embodiment in FIG. 2A.

The memory 123 may be a read-only memory (ROM) or another type of static storage device that stores static information and a static instruction or a random-access memory (RAM) or another type of dynamic storage device that stores information and an instruction, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a blue-ray disc, or the like), a magnetic disk storage medium or another magnetic storage device, or any other medium that can be configured to carry or store expected program code that has a form of an instruction or data structure and that can be accessed by an integrated circuit. However, this application is not limited thereto. The memory 123 may exist independently and is connected to the processor 124 by using the communications bus 125. The memory 123 may alternatively be integrated with the processor 124.

In addition, the communications bus 125 may include a channel for transferring information between the processor 124 and the memory 123.

Figure 2A:
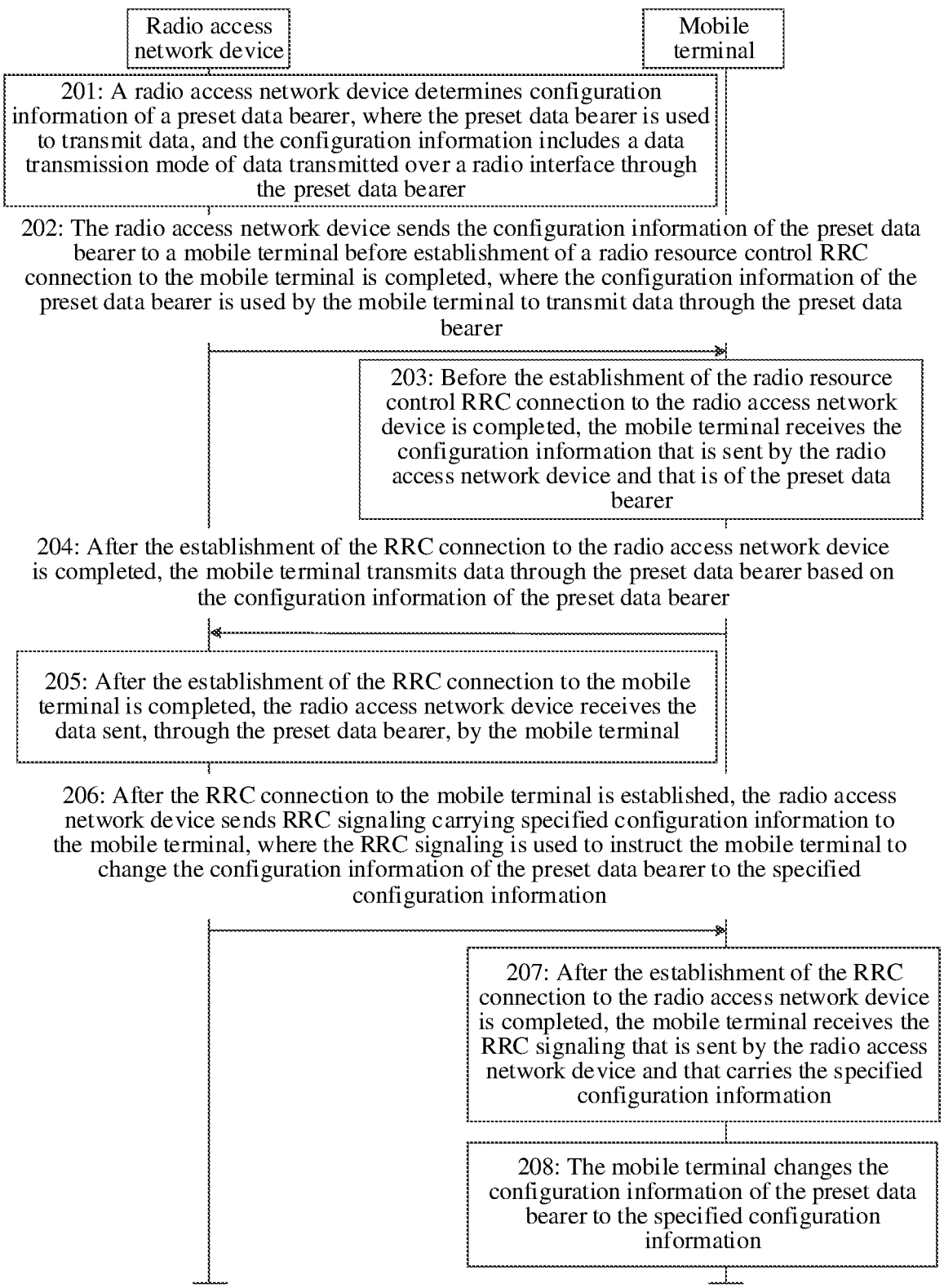
FIG. 2A is a flowchart of a data transmission method according to an example of an embodiment.

FIG. 2A is a flowchart of a data transmission method according to an example of an embodiment. In this embodiment of this application, an example in which a manner of interaction between a radio access network device and a mobile terminal is used to implement the data transmission method is used for description. The data transmission method may include, for example, the following steps.

Step 201: A radio access network device determines configuration information of a preset data bearer, where the preset data bearer is used to transmit data, and the configuration information includes a data transmission mode of data transmitted over a radio interface through the preset data bearer.

A mechanism of the preset data bearer is introduced in this embodiment of this application. To be specific, based on the data transmission method provided in this embodiment of this application, a data bearer used to transmit data may include two parts: One part is a conventional DRB established using a dedicated signaling process, and the other part is the preset data bearer used in this embodiment of this application.

The preset data bearer may belong to each cell or base station. To be specific, each mobile terminal in a cell or a base station may use the preset data bearer configured by the cell or the base station. Therefore, in a possible implementation, the preset data bearer may also be referred to as a cell data bearer. In addition, in the fifth generation (5G) mobile communication, a network may be divided into network slices. Therefore, the preset data bearer may belong to various network slices. To be specific, in a possible implementation, in 5G mobile communication, the preset data bearer may be established by using a network slice.

Figure 2B:
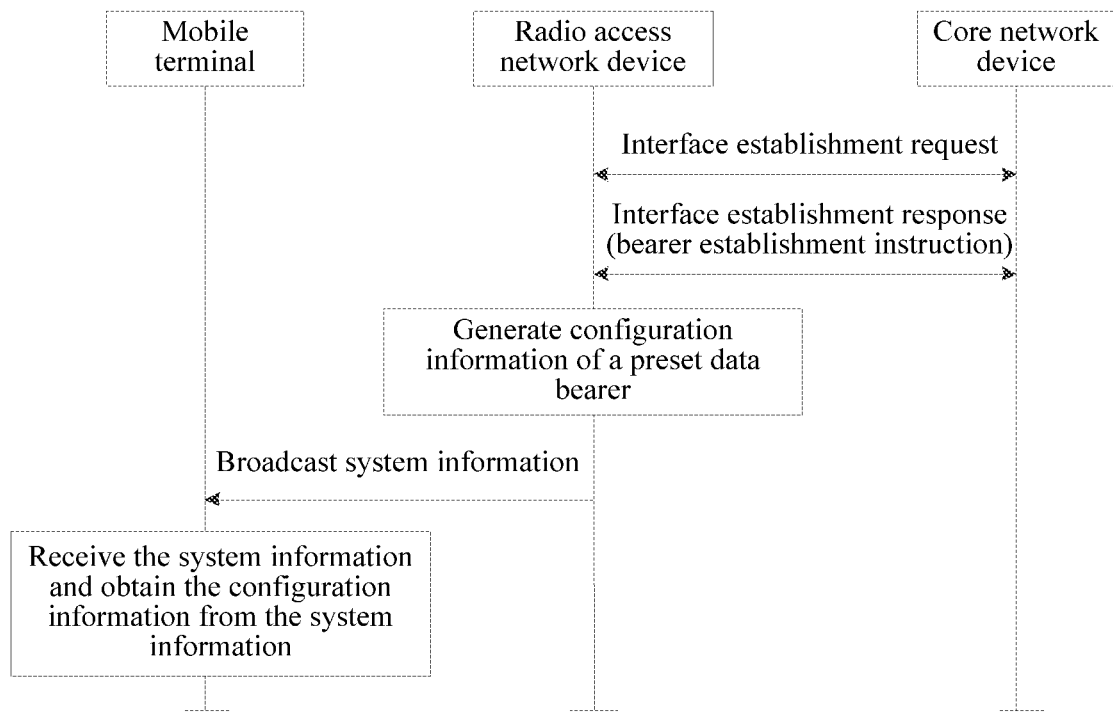
FIG. 2B is a flowchart of a data transmission method used in the embodiment in FIG. 2A.

In a possible implementation, an implementation process in which the radio access network device determines the configuration information of the preset data bearer may include: referring to FIG. 2B, during establishment of an interface connection to a core network device, sending, by the radio access network device, an interface establishment request to the core network device, after receiving the interface establishment request, returning, by the core network device, an interface establishment response, where the interface establishment response carries a bearer establishment instruction, and the bearer establishment instruction includes quality of service (QoS), and generating, by the radio access network device, the configuration information of the preset data bearer based on the QoS. The bearer establishment instruction may instruct to establish a plurality of preset bearers. The radio access network device may generate configuration information of one or more preset data bearers based on the bearer establishment instruction.

It should be noted that an interface established between the radio access network device and the core network device is a common interface between the radio access network device and the core network device, but is not an interface established for a mobile terminal.

For example, in a Long Term Evolution (LTE) network, during establishment of an S1 interface connection, the radio access network device sends an S1 interface establishment request to the core network device. After receiving the S1 interface establishment request, the core network device sends an S1 interface establishment response carrying the foregoing bearer establishment instruction to the radio access network device. After receiving the S1 interface establishment response, the radio access network device obtains the bearer establishment instruction from the S1 interface establishment response, and generates the configuration information of the preset data bearer based on the QoS included in the bearer establishment instruction.

For a specific implementation process in which the radio access network device generates the configuration information of the preset data bearer based on the QoS, refer to a related technology. This is not limited in this embodiment of this application.

Certainly, it should be noted that the foregoing implementation of determining the configuration information of the preset data bearer is only an example. In another possible implementation, for the QoS, after establishment of an interface to the core network device is completed, the radio access network device may send a QoS obtaining request to the core network device, so that the core network device sends the QoS to the radio access network device. Subsequently, the radio access network device generates the configuration information of the preset data bearer based on the QoS.

The configuration information of the preset data bearer includes at least one of a preset data bearer identifier, logic channel information, Radio Link Control (RLC) configuration information, and packet data convergence protocol (PDCP) configuration information.

The preset data bearer identifier is used to uniquely identify one preset data bearer. In a possible implementation, the preset data bearer identifier and a DRB identifier are numbered together. For example, if a DRB identifier is numbered "1", the preset data bearer identifier may be numbered "2". Another DRB that is established may then continue to be numbered subsequently based on the sequence.

It should be noted that the configuration information of the preset data bearer may further include other optional information in addition to the foregoing information.

Specifically, the configuration information of the preset data bearer includes use condition information and/or a first mapping relationship, the use condition information is used to indicate a condition that needs to be met by a mobile terminal that can use the preset data bearer, and the first mapping relationship is a mapping relationship between a data type and a data bearer supporting the data type.

In a possible implementation, the use condition information and/or the first mapping relationship may be specified by the core network device. In this way, the use condition information and/or the first mapping relationship may be added by the core network device to the foregoing bearer establishment instruction. Further, in this case, the first mapping relationship may be included in a non-access stratum protocol data unit (NAS PDU). To be specific, the NAS PDU includes the mapping relationship between a data type and a data bearer supporting the data type. Based on the first mapping relationship and information such as a internet protocol (IP) 5-tuple included in a transmitted data packet, the mobile terminal may determine a data bearer on which data should be transmitted.

The IP 5-tuple includes a source IP address, a destination IP address, a source port number, a destination port number, and a transport protocol. The source IP address is an IP address of a transmit end. The destination IP address is an IP address of a receive end. The source port number is a port number of the transmit end. The destination port number is a port number of the receive end. The transport protocol is a protocol used for transmitting data.

In another possible implementation, the use condition information and/or the first mapping relationship may alternatively be specified by the radio access network device. In this case, the use condition information and/or the first mapping relationship may be automatically generated by the radio access network device based on QoS.

When the configuration information includes use condition information, it indicates that the radio access network device restricts a condition for using the preset data bearer. The condition information may specifically include, for example, any one of the following implementations (1) to (3).

The condition information may include a specific service identifier. The specific service identifier is used to uniquely identify a specific service. In this case, it means that only a mobile terminal that has subscribed to the specific service meets the condition for using the preset data bearer, or when the mobile terminal may meet the condition for using the preset data bearer when initiating the specific service.

The condition information may include a specific type identifier. The specific type identifier may be used to uniquely identify one type of mobile terminal. In this case, it means that only a mobile terminal having the specific type can use the preset data bearer.

The condition information may include a specific service identifier and a specific type identifier. In this case, it means that a mobile terminal meets the condition for using the preset data bearer only when the mobile terminal has a specific type and has subscribed to a specific service or has initiated a specific service.

Step 202: The radio access network device sends the configuration information of the preset data bearer to a mobile terminal before establishment of a radio resource control (RRC) connection to the mobile terminal is completed, where the configuration information of the preset data bearer is used by the mobile terminal to transmit data through the preset data bearer.

Figure 2C:
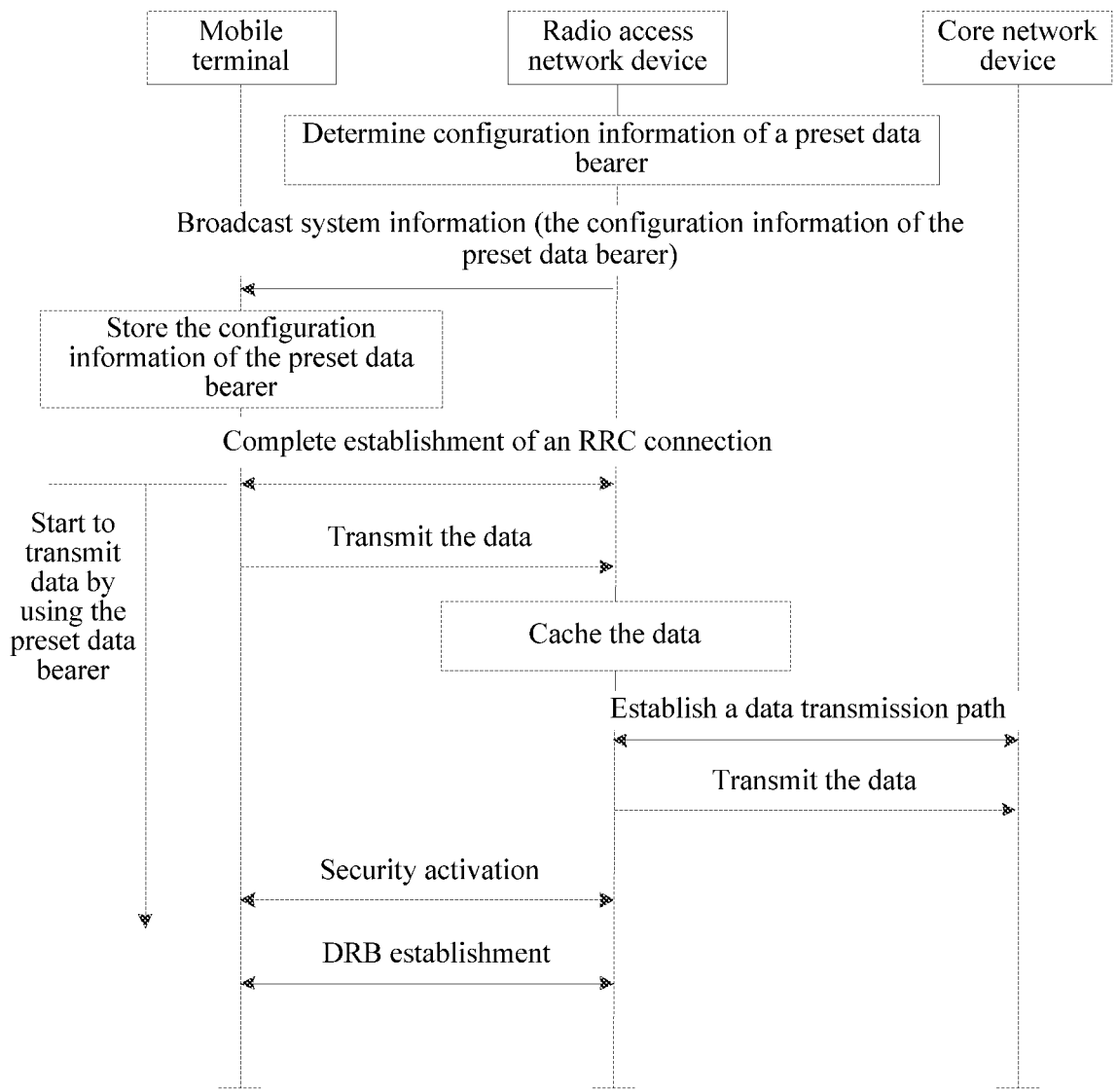
FIG. 2C is a flowchart of another data transmission method used in the embodiment in FIG. 2A.

After determining the configuration information of the preset data bearer and completing the establishment of the radio resource control (RRC) connection to the mobile terminal, the radio access network device may send the configuration information to the mobile terminal. An implementation in which the radio access network device sends the configuration information of the preset data bearer to the mobile terminal may include: broadcasting system information, where the system information includes the configuration information of the preset data bearer. Referring to FIG. 2C, in this implementation, the radio access network device sends the configuration information to the mobile terminal in a manner of broadcasting the system information.

Step 203: Before the establishment of the radio resource control (RRC) connection to the radio access network device is completed, the mobile terminal receives the configuration information that is sent by the radio access network device and that is of the preset data bearer.

Specifically, the system information broadcast by the radio access network device is received, where the system information includes the configuration information of the preset data bearer.

In this way, when the radio access network device sends the configuration information of the preset data bearer to the mobile terminal in a manner of broadcasting the system information, correspondingly, the mobile terminal receives the system information broadcast by the radio access network device, and obtains the configuration information of the preset data bearer from the system information.

After receiving, in the foregoing manner, the configuration information that is sent by the radio access network device and that is of the preset data bearer, the mobile terminal stores the configuration information of the preset data bearer.

Step 204: After the establishment of the RRC connection to the radio access network device is completed, the mobile terminal transmits data through the preset data bearer based on the configuration information of the preset data bearer.

Referring to FIG. 2C, after the establishment of the RRC connection to the radio access network device is completed, it may be considered that establishment of the preset data bearer is completed. To be specific, the preset data bearer is usable. In this case, the mobile terminal may transmit data through the preset data bearer based on the configuration information of the preset data bearer.

In a process of transmitting data through the preset data bearer based on the configuration information of the preset data bearer, some parameters of the configuration information that are in the configuration information may use default values regulated in a specified protocol. This type of default values may not need to be sent by the radio access network device to the mobile terminal. In this way, overheads of broadcasting signaling are reduced. During actual applications, the radio access network device may need to regulate some parameters of the configuration information. In this case, the radio access network device may broadcast parameters of the configuration information that need to be regulated. That is, if the radio access network device broadcasts parameters of the configuration information, the mobile terminal uses the broadcast parameters. If the radio access network device broadcasts no parameter, the mobile terminal uses default values regulated in the specified protocol.

The specified protocol may be customized by a user according to an actual requirement, or may be set by the mobile terminal by default. This is not limited in this embodiment of this application.

In addition, it should be noted that in this embodiment of this application, only an example in which the mobile terminal transmits data through the preset data bearer based on the configuration information of the preset data bearer after the establishment of the RRC connection to the radio access network device is completed is used for description. In another embodiment, the data transmission method provided in this embodiment of this application is also applicable to a scenario in which an RRC connection is not established. For example, for transmission of small packet data, an RRC connection is not established, but instead, after the mobile terminal obtains a data transmission resource in a contention manner, the mobile terminal may alternatively use the preset data bearer to perform data transmission.

In addition, it should further be noted that, as discussed above, the configuration information may further include the foregoing optional information. When the configuration information includes the foregoing optional configuration information, for the mobile terminal, before data is transmitted through the preset data bearer based on the configuration information of the preset data bearer, corresponding operations need to be performed based on the optional configuration information. Specifically, several possible implementations in the following are included:

In a first possible implementation, when the configuration information of the preset data bearer includes the use condition information, it is determined whether a condition indicated in the use condition information is met, where the use condition information is used to indicate a condition that needs to be met by a mobile terminal that can use the preset data bearer, and when the condition indicated in the use condition information is met, the step of transmitting data through the preset data bearer based on the configuration information of the preset data bearer is performed.

As discussed above, when the configuration information includes use condition information, it indicates that the radio access network device restricts a condition for using the preset data bearer. Therefore, the mobile terminal needs to determine whether the mobile terminal meets the condition, and the mobile terminal can transmit data through the preset data bearer only when the mobile terminal meets the condition.

For example, the use condition information includes a specific type identifier and the specific type identifier is UE_1. If a type identifier of the mobile terminal is UE_1, it indicates that the mobile terminal meets the condition indicated in the condition information. In this case, the mobile terminal may transmit data through the preset data bearer. However, if a type identifier of the mobile terminal is UE_2, it indicates that the mobile terminal does not meet the condition indicated in the condition information. In this case, the mobile terminal cannot transmit data through the preset data bearer.

In a second possible implementation, when the configuration information of the preset data bearer includes a first mapping relationship, a data type of the data is determined, where the first mapping relationship is a mapping relationship between a data type and a data bearer supporting the data type. Based on the first mapping relationship, it is determined whether a data bearer corresponding to the data type of the data is the preset data bearer. When the data bearer corresponding to the data type of the data is the preset data bearer, the step of transmitting data through the preset data bearer based on the configuration information of the preset data bearer is performed.

In this way, before data transmission, the mobile terminal determines a data type of data to be transmitted. Subsequently, the mobile terminal determines, based on the first mapping relationship, a data bearer corresponding to the data type of the data to be transmitted. If the data bearer is the preset data bearer, it indicates that the mobile terminal may transmit, through the preset data bearer, the data to be transmitted. However, if the data bearer is not the preset data bearer, it indicates that the mobile terminal may transmit, through the preset data bearer, the data to be transmitted.

Step 205: After the establishment of the RRC connection to the mobile terminal is completed, the radio access network device receives the data sent through the preset data bearer by the mobile terminal.

Referring to FIG. 2C, after the mobile terminal transmits data to the radio access network device, correspondingly, the radio access network device starts to receive the data. Subsequently, the radio access network device sends the data to a next-level node, for example, transmits the data to a serving gateway. In a possible implementation, before transmitting the data to the next-level node, the radio access network device may detect that a sending condition is not met. For example, a data transmission path between the radio access network device and the next-level node may still be not established. Alternatively, when the data is encrypted data, the radio access network device still does not receive a decryption key that is sent by a core network device and that is of the mobile terminal. In this case, the radio access network device caches the received data, and sends the received data to the next-level node when the sending condition is met. For example, after a data transmission path is established between the radio access network device and the core network device by using a context establishment process and the decryption key is determined by receiving the context establishment process that is sent by the core network device and that is of the mobile terminal, decryption processing is performed on the cached data, and subsequently, decrypted data is sent to the next-level node, to implement data transmission.

It should be noted that after data is transmitted based on the preset data bearer, the radio access network device and the mobile terminal may perform subsequent procedures. For example, referring to FIG. 2C, processes such as security activation and DRB establishment may further continue to be performed.

The data transmission method provided in this embodiment of this application is implemented based on the foregoing steps. However, during actual application, during data transmission, the radio access network device may need to change the configuration information due to factors such as a change of a communication environment. Therefore, in this embodiment of this application, optionally, the following step 206 to step 208 are further provided.

Step 206: After the RRC connection to the mobile terminal is established, the radio access network device sends RRC signaling carrying specified configuration information to the mobile terminal, where the RRC signaling is used to instruct the mobile terminal to change the configuration information of the preset data bearer to the specified configuration information.

In this way, during actual transmission, when the radio access network device needs to change the configuration information of the preset data bearer, the RRC signaling may be used to carry the specified configuration information, so that when receiving the RRC signaling, the mobile terminal directly obtains the specified configuration information from the RRC signaling. To be specific, the specified configuration information is determined by the radio access network device.

Step 207: After the establishment of the RRC connection to the radio access network device is completed, the mobile terminal receives the RRC signaling that is sent by the radio access network device and that carries the specified configuration information.

Step 208: The mobile terminal changes the configuration information of the preset data bearer to the specified configuration information.

In this embodiment of this application, the configuration information that may be used to transmit data and that is of the preset data bearer is determined, and the configuration information is sent to the mobile terminal before the establishment of the radio resource control RRC connection to the mobile terminal is completed. The configuration information includes the data transmission mode of data transmitted over the radio interface through the preset data bearer. Therefore, after receiving the configuration information, the mobile terminal can transmit data through the preset data bearer based on the configuration information. In this way, after the establishment of the RRC connection is completed, the mobile terminal can use the preset data bearer to transmit data, thereby avoiding that a plurality of signaling interactions are required before a data bearer can be established, so that a data transmission latency is reduced.

Figure 3:
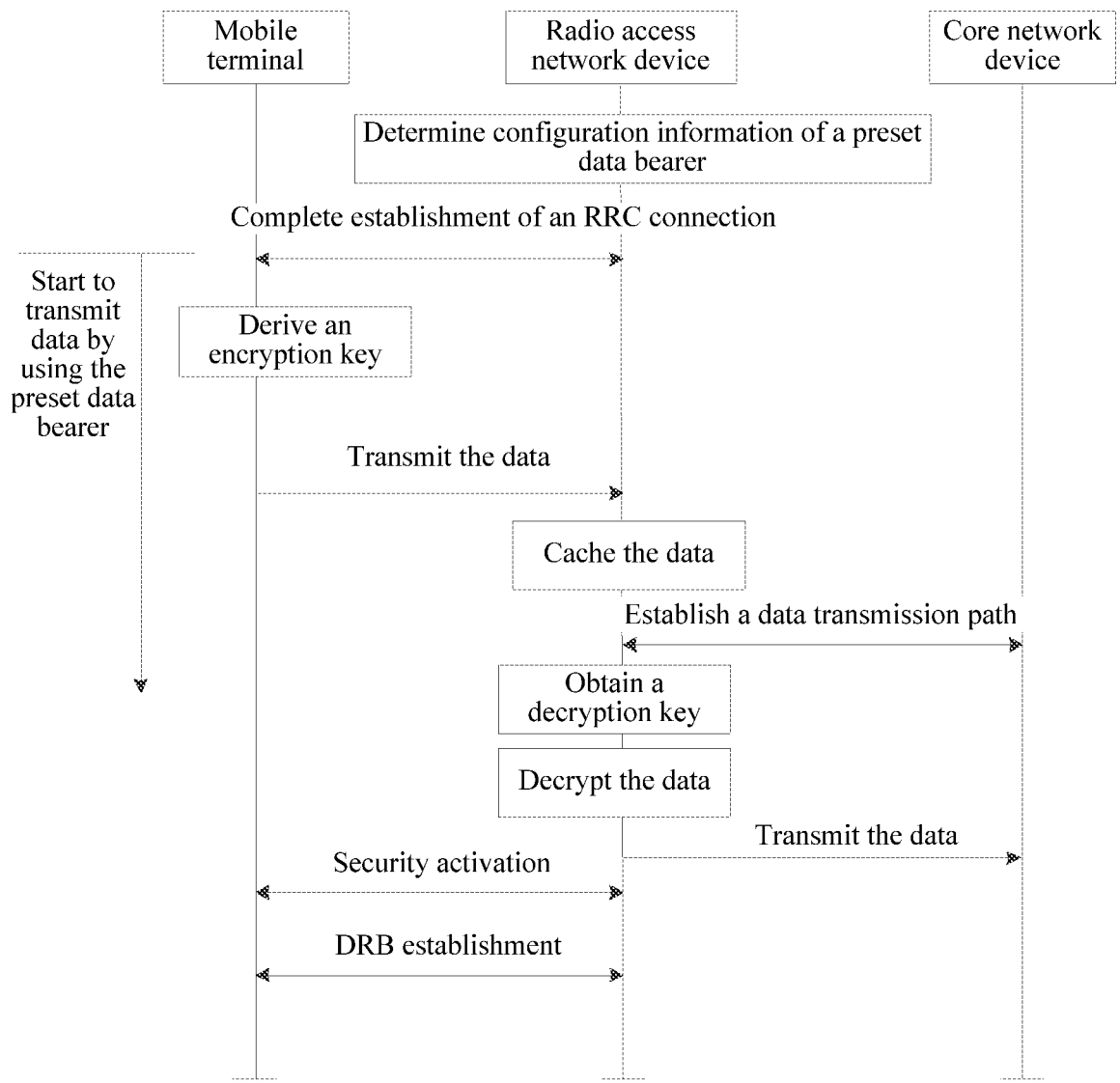
FIG. 3 is a flowchart of another data transmission method used in the embodiment in FIG. 2A.

All information included in the configuration information of the preset data bearer in the embodiment in FIG. 2A is only an example. In another embodiment, the configuration information of the preset data bearer may further include, in addition to all the information discussed in the foregoing FIG. 2A, an encryption instruction and/or capacity indication information. As shown in FIG. 3, in this case, before transmitting data through the preset data bearer based on the configuration information of the preset data bearer, the mobile terminal needs to perform a corresponding operation on the data based on the encryption instruction and/or the capacity indication information.

Step 301: A radio access network device determines configuration information of a preset data bearer.

As discussed above, the configuration information of the preset data bearer may further include an encryption instruction and/or capacity indication information. For details, refer to the following two implementations (1) and (2).

(1) The configuration information of the preset data bearer includes an encryption instruction, and the encryption instruction is used to instruct the mobile terminal to perform encryption processing on data that needs to be transmitted.

During data transmission, for security of data transmission, the radio access network device may instruct, according to an actual requirement, the mobile terminal to perform encryption processing on data to be transmitted. Therefore, the configuration information may carry the encryption instruction.

In addition, based on the implementation, when the mobile terminal needs to be instructed to perform encryption processing on the data to be transmitted, there is further an issue of a security algorithm used in encryption. Therefore, in a possible implementation, the configuration information of the preset data bearer further includes a security algorithm identifier, and the security algorithm identifier is used to instruct the mobile terminal to perform, based on a security algorithm corresponding to the security algorithm identifier, encryption processing on the data that needs to be transmitted.

The security algorithm identifier is used to uniquely identify a security algorithm. Generally, the security algorithm corresponding to the security algorithm identifier is relatively common, so that most mobile terminals support the security algorithm. In a possible implementation, if the mobile terminal does not support the security algorithm corresponding to the security algorithm identifier, the mobile terminal cannot use the preset data bearer.

Certainly, it should further be noted that in this embodiment of this application, only an example in which the configuration information includes an encryption instruction is used for description. In another embodiment, the configuration information may alternatively not include an encryption instruction. For example, generally, when a service performs an encryption operation on an application layer, a service does not need encryption, or a core network device has provided security protection, the encryption instruction may not be carried in the configuration information.

(2) The configuration information of the preset data bearer further includes capacity indication information, and the capacity indication information is used to indicate a maximum amount of uplink data that the mobile terminal is allowed to upload.

In this way, considering a caching capability of the radio access network device, the radio access network device may restrict a maximum amount of uplink data that can be uploaded by each mobile terminal.

It should be noted that an implementation of determining the configuration information of the preset data bearer in step 301 is similar to an implementation of the foregoing step 201. Details are not described herein.

Step 302: The radio access network device sends the configuration information of the preset data bearer to a mobile terminal before establishment of a radio resource control RRC connection to the mobile terminal is completed.

Step 301 is similar to the foregoing step 201. Details are not described herein.

Step 303: Before the establishment of the radio resource control RRC connection to the radio access network device is completed, the mobile terminal receives the configuration information that is sent by the radio access network device and that is of the preset data bearer.

Step 303 is similar to the foregoing step 203. Details are not described herein.

Step 304: After the establishment of the RRC connection to the radio access network device is completed, the mobile terminal transmits data through the preset data bearer based on the configuration information of the preset data bearer.

In this embodiment of this application, the configuration information may further include an encryption instruction and/or capacity indication information. Therefore, the mobile terminal needs to determine, based on the encryption instruction and/or the capacity indication information, whether a condition of transmitting data through the preset data bearer based on the configuration information of the preset data bearer is met. Specifically, the following two possible implementations may be included.

In a first possible implementation, when the configuration information of the preset data bearer includes an encryption instruction, encryption processing is performed on data that needs to be transmitted.

Referring to FIG. 3, when the configuration information of the preset data bearer includes an encryption instruction, it indicates that the radio access network device requires that the mobile terminal should perform encryption processing on the data to be transmitted. In this case, after the establishment of an RRC connection is completed, the mobile terminal derives an encryption key based on the process of establishing an RRC connection. For example, in the LTE network, the mobile terminal may derive, based on an uplink sequence value included in a NAS message carried in an RRC connection establishment completion message, the encryption key used by the mobile terminal. Subsequently, the mobile terminal may perform encryption processing on the data.

In addition, when the configuration information of the preset data bearer includes a security algorithm identifier, encryption processing is performed, based on a security algorithm corresponding to the security algorithm identifier, on the data that needs to be transmitted.

It should be noted that in this embodiment of this application, only an example in which the configuration information includes a security algorithm identifier is used for description. In another possible implementation, if the configuration information does not include a security algorithm identifier, the mobile terminal may use any security algorithm regulated by default in the foregoing specified protocol.

In a second possible implementation, when the configuration information of the preset data bearer includes capacity indication information, it is determined whether a size of data that has been transmitted over the preset data bearer is greater than a maximum amount that is indicated in the capacity indication information and that is of uplink data. When the size of data that has been transmitted over the preset data bearer is greater than the maximum amount that is indicated in the capacity indication information and that is of uplink data, the step of transmitting data through the preset data bearer based on the configuration information of the preset data bearer stops being performed.

In a possible implementation, in the process of transmitting data through the preset data bearer based on the configuration information of the preset data bearer, the mobile terminal may further measure an amount of uploaded data. When a measurement result is greater than the maximum amount of uplink data, the mobile terminal stops transmitting data through the preset data bearer based on the configuration information of the preset data bearer.

For example, the maximum amount of uplink data is 10 M bytes. If a size of data that has been transmitted over the preset data bearer is 11 M bytes, the mobile terminal does not transmit data through the preset data bearer based on the configuration information of the preset data bearer.

In addition, it should be noted that the foregoing restriction that is sent by the mobile terminal and that is on the amount of uplink data is only imposed on the preset data bearer. After security activation is performed on the radio access network device, the amount of uplink data may no longer need to be restricted.

Step 305: After the establishment of the RRC connection to the mobile terminal is completed, the radio access network device receives the data sent through the preset data bearer by the mobile terminal.

Step 305 is similar to the foregoing step 205. Details are not described herein.

Step 306: After the RRC connection to the mobile terminal is established, the radio access network device sends RRC signaling carrying specified configuration information to the mobile terminal.

Step 306 is similar to the foregoing step 206. Details are not described herein.

Step 307: After the establishment of the RRC connection to the radio access network device is completed, the mobile terminal receives the RRC signaling that is sent by the radio access network device and that carries the specified configuration information.

Step 307 is similar to the foregoing step 207. Details are not described herein.

Step 308: The mobile terminal changes the configuration information of the preset data bearer to the specified configuration information.

Step 308 is similar to the foregoing step 208. Details are not described herein.

In this embodiment of this application, the configuration information that may be used to transmit data and that is of the preset data bearer is determined, and the configuration information is sent to the mobile terminal before the establishment of the radio resource control RRC connection to the mobile terminal is completed. The configuration information includes the data transmission mode of data transmitted over the radio interface through the preset data bearer. Therefore, after receiving the configuration information, the mobile terminal can transmit data through the preset data bearer based on the configuration information. In this way, after the establishment of the RRC connection is completed, the mobile terminal can use the preset data bearer to transmit data, thereby avoiding that a plurality of signaling interactions are required before a data bearer can be established, so that a data transmission latency is reduced.

Figure 4:
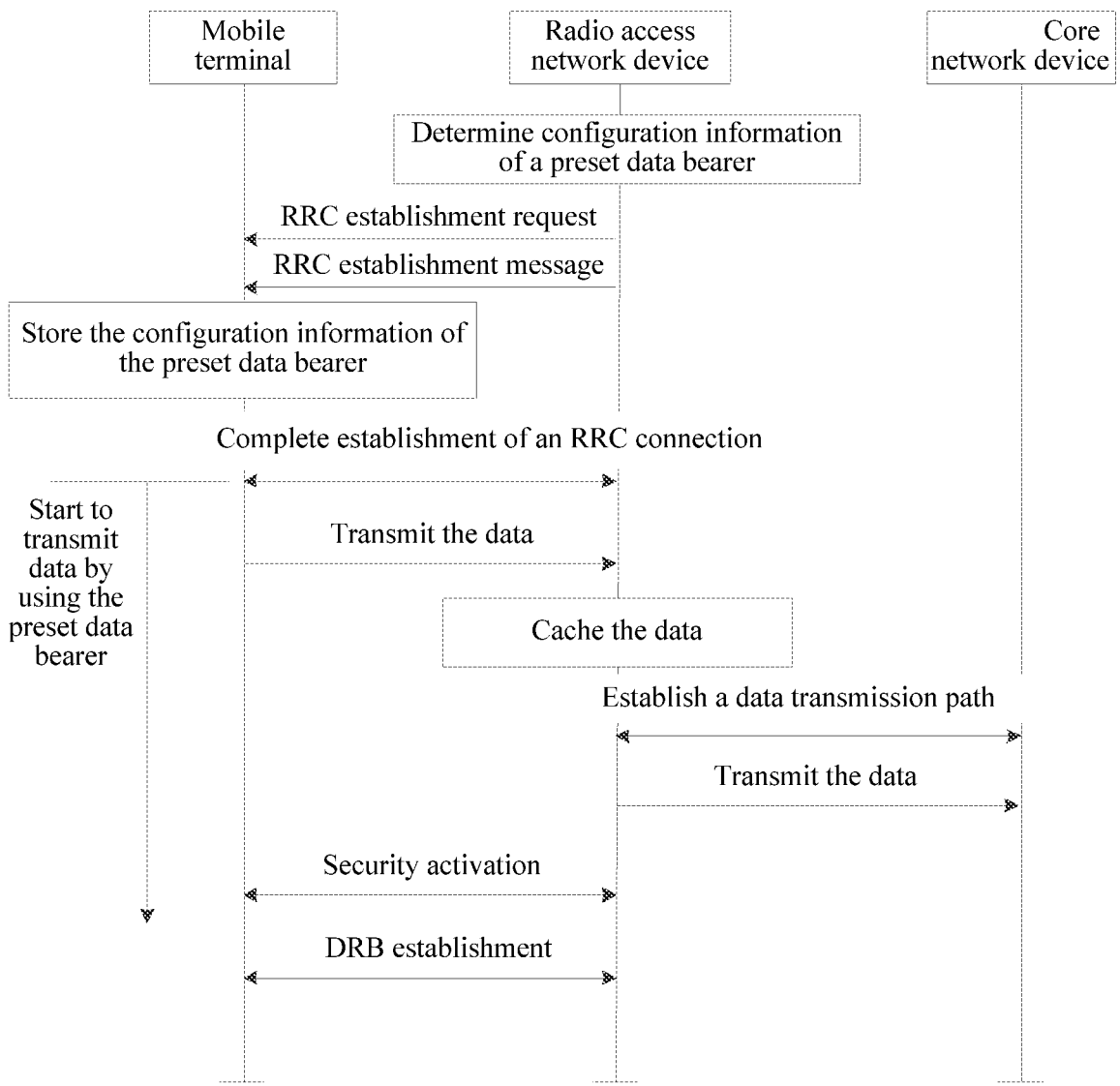
FIG. 4 is a flowchart of another data transmission method used in the embodiment in FIG. 2A.

In the embodiment shown in FIG. 2A, system information is broadcast to send the configuration information of the preset data bearer to the mobile terminal. In another embodiment, the configuration information of the preset data bearer may further be sent to the mobile terminal by using a specified message. As shown in FIG. 4, during the establishment of the RRC connection, the radio access network device adds the configuration information of the preset data bearer to the specified message sent to the mobile terminal. Correspondingly, during the establishment of the RRC connection, the mobile terminal receives the specified message sent by the radio access network device to obtain the configuration information of the preset data bearer.

Step 401: A radio access network device determines configuration information of a preset data bearer.

Step 401 is similar to the foregoing step 201. Details are not described herein.

Step 402: The radio access network device sends the configuration information of the preset data bearer to a mobile terminal before establishment of a radio resource control RRC connection to the mobile terminal is completed.

In this embodiment of this application, a specific implementation of sending the configuration information of the preset data bearer to the mobile terminal includes: during the establishment of the RRC connection, adding the configuration information of the preset data bearer to a specified message sent to the mobile terminal.

Referring to FIG. 4, in this implementation, during the establishment of the RRC connection, the radio access network device instructs the mobile terminal to establish the preset data bearer. For example, in a possible implementation, the specified message is a radio resource control RRC establishment message. In this way, the radio access network device adds the configuration information of the preset data bearer to the RRC establishment message, and sends the configuration information of the preset data bearer to the mobile terminal by using the RRC establishment message.

The configuration information of the preset data bearer is sent to the mobile terminal in different manners in the foregoing, so that there are more manners of sending the configuration information of the preset data bearer to the mobile terminal.

Step 403: Before the establishment of the radio resource control (RRC) connection to the radio access network device is completed, the mobile terminal receives the configuration information that is sent by the radio access network device and that is of the preset data bearer.

In this embodiment of the present invention, an implementation of receiving the configuration information that is sent by the radio access network device and that is of the preset data bearer includes: during the establishment of the RRC connection, receiving the specified message sent by the radio access network device, where the specified message carries the configuration information of the preset data bearer.

In this way, when the radio access network device sends the configuration information of the preset data bearer to the mobile terminal by using the specified message. After receiving the specified message, the mobile terminal may obtain the configuration information of the preset data bearer from the specified message.

Step 404: After the establishment of the RRC connection to the radio access network device is completed, the mobile terminal transmits data through the preset data bearer based on the configuration information of the preset data bearer.

Step 404 is similar to the foregoing step 204. Details are not described herein.

Step 405: After the establishment of the RRC connection to the mobile terminal is completed, the radio access network device receives the data sent through the preset data bearer by the mobile terminal.

Step 405 is similar to the foregoing step 205. Details are not described herein.

Step 406: After the RRC connection to the mobile terminal is established, the radio access network device sends RRC signaling carrying specified configuration information to the mobile terminal.

Step 406 is similar to the foregoing step 206. Details are not described herein.

Step 407: After the establishment of the RRC connection to the radio access network device is completed, the mobile terminal receives the RRC signaling that is sent by the radio access network device and that carries the specified configuration information.

Step 407 is similar to the foregoing step 207. Details are not described herein.

Step 408: The mobile terminal changes the configuration information of the preset data bearer to the specified configuration information.

Step 408 is similar to the foregoing step 208. Details are not described herein.

In this embodiment of this application, the configuration information that may be used to transmit data and that is of the preset data bearer is determined, and the configuration information is sent to the mobile terminal before the establishment of the radio resource control RRC connection to the mobile terminal is completed. The configuration information includes the data transmission mode of data transmitted over the radio interface through the preset data bearer. Therefore, after receiving the configuration information, the mobile terminal can transmit data through the preset data bearer based on the configuration information. In this way, after the establishment of the RRC connection is completed, the mobile terminal can use the preset data bearer to transmit data, thereby avoiding that a plurality of signaling interactions are required before a data bearer can be established, so that a data transmission latency is reduced.

Figure 5A:
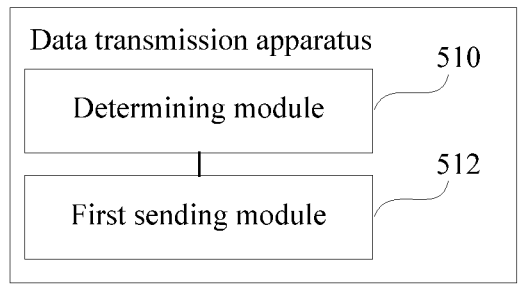
FIG. 5A is a schematic structural diagram of a data transmission apparatus according to an example of an embodiment.

FIG. 5A is a schematic structural diagram of a data transmission apparatus according to an example of an embodiment. The data transmission apparatus may be implemented by using software, hardware or a combination of software and hardware as a part of a wireless access device or an entire wireless access device. The data transmission apparatus may include a determining module 510 and a first sending module 512.

The determining module 510 is configured to perform any one of the foregoing step 201, step 301, and step 401.

The first sending module 512 is configured to perform any one of the foregoing step 202, step 302, and step 402.

In a possible implementation, the configuration information of the preset data bearer includes at least one of a preset data bearer identifier, logic channel information, Radio Link Control (RLC) configuration information, and packet data convergence protocol (PDCP) configuration information.

In a possible implementation, the configuration information of the preset data bearer includes use condition information and/or a first mapping relationship, the use condition information is used to indicate a condition that needs to be met by a mobile terminal that can use the preset data bearer, and the first mapping relationship is a mapping relationship between a data type and a data bearer supporting the data type.

Figure 5B:
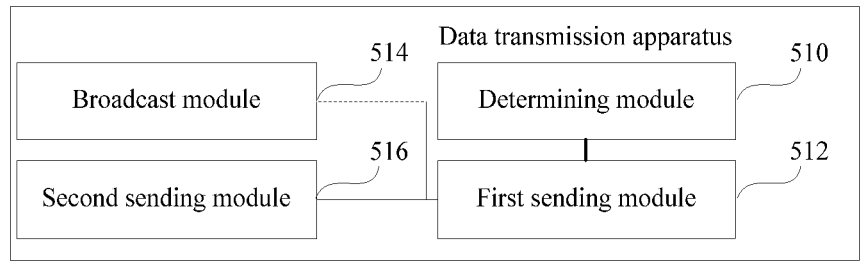
FIG. 5B is a schematic structural diagram of a data transmission apparatus according to another example of an embodiment.
Figure 5C:
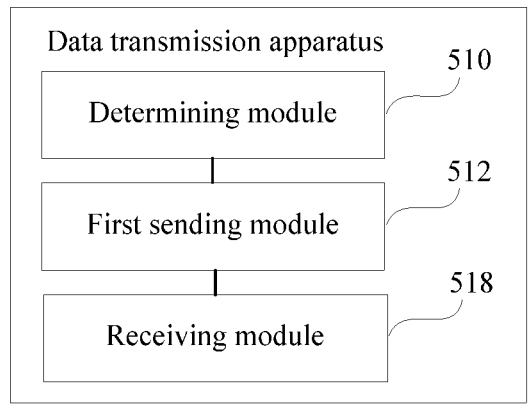
FIG. 5C is a schematic structural diagram of a data transmission apparatus according to another example of an embodiment.
Figure 5D:
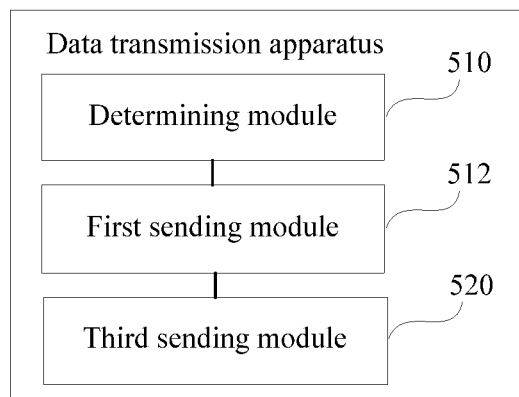
FIG. 5D is a schematic structural diagram of a data transmission apparatus according to another example of an embodiment.

In a possible implementation, referring to FIG. 5B to FIG. 5D, the apparatus further includes: a broadcast module 514, configured to broadcast system information, where the system information includes the configuration information of the preset data bearer; and a second sending module 516, configured to: during the establishment of an RRC connection, add the configuration information of the preset data bearer to a specified message sent to the mobile terminal.

In a possible implementation, the specified message is a radio resource control RRC establishment message.

In a possible implementation, the apparatus further includes: a receiving module 518, configured to perform any one of the foregoing step 205, step 305, and step 405.

In a possible implementation, the configuration information of the preset data bearer includes an encryption instruction, and the encryption instruction is used to instruct the mobile terminal to perform encryption processing on data that needs to be transmitted.

In a possible implementation, the configuration information of the preset data bearer further includes a security algorithm identifier, and the security algorithm identifier is used to instruct the mobile terminal to perform, based on a security algorithm corresponding to the security algorithm identifier, encryption processing on the data that needs to be transmitted.

In a possible implementation, the configuration information of the preset data bearer further includes capacity indication information, and the capacity indication information is used to indicate a maximum amount of uplink data that the mobile terminal is allowed to upload.

In a possible implementation, the apparatus further includes: a third sending module 520, configured to perform any one of the foregoing step 206, step 306, and step 406.

In this embodiment of this application, the configuration information that may be used to transmit data and that is of the preset data bearer is determined, and the configuration information is sent to the mobile terminal before the establishment of the radio resource control (RRC) connection to the mobile terminal is completed. The configuration information includes the data transmission mode of data transmitted over the radio interface through the preset data bearer. Therefore, after receiving the configuration information, the mobile terminal can transmit data through the preset data bearer based on the configuration information. In this way, after the establishment of the RRC connection is completed, the mobile terminal can use the preset data bearer to transmit data, thereby avoiding that a plurality of signaling interactions are required before a data bearer can be established, so that a data transmission latency is reduced.

Figure 6A:
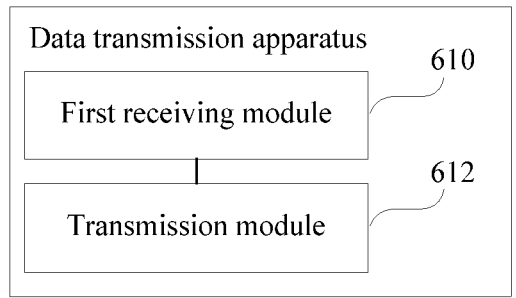
FIG. 6A is a schematic structural diagram of a data transmission apparatus according to an example of an embodiment.
Figure 6B:
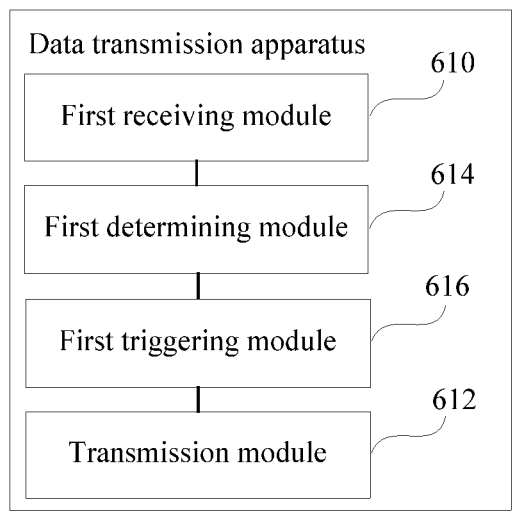
FIG. 6B is a schematic structural diagram of a data transmission apparatus according to another example of an embodiment.
Figure 6C:
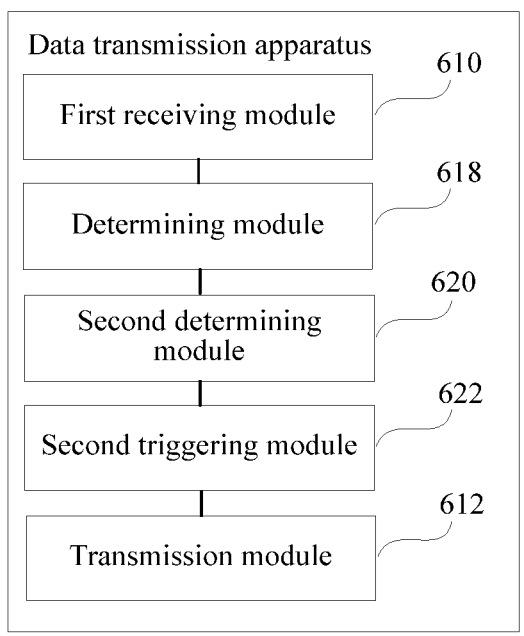
FIG. 6C is a schematic structural diagram of a data transmission apparatus according to another example of an embodiment.
Figure 6D:
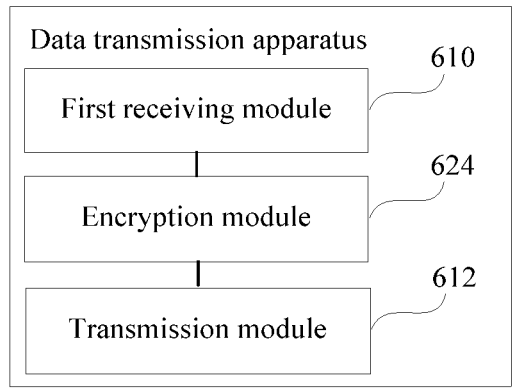
FIG. 6D is a schematic structural diagram of a data transmission apparatus according to another example of an embodiment.
Figure 6E:
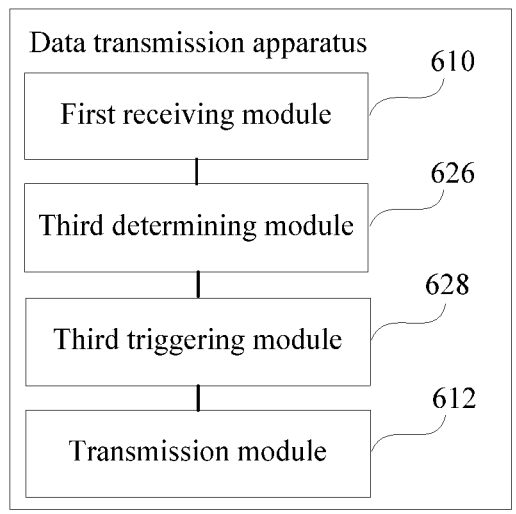
FIG. 6E is a schematic structural diagram of a data transmission apparatus according to another example of an embodiment.
Figure 6F:
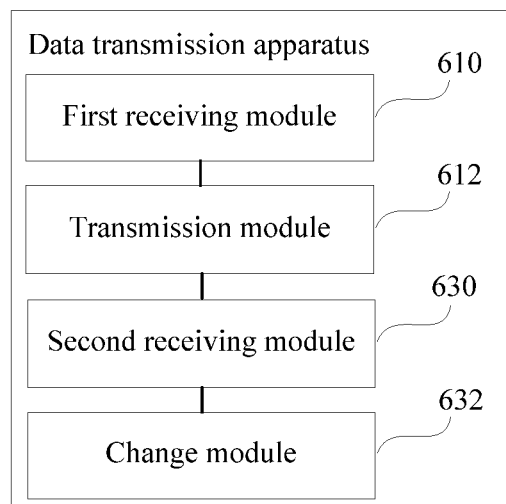
FIG. 6F is a schematic structural diagram of a data transmission apparatus according to another example of an embodiment.

FIG. 6A is a schematic structural diagram of a data transmission apparatus according to an example of an embodiment. The data transmission apparatus may be implemented by using software, hardware or a combination of software and hardware as a part of a mobile terminal or a mobile terminal. The data transmission apparatus may include a first receiving module 610 and a transmission module 612.

The first receiving module 610 is configured to perform any one of the foregoing step 203, step 303, and step 403.

The transmission module 612 is configured to perform any one of the foregoing step 204, step 304, and step 404.

In a possible implementation, the configuration information of the preset data bearer includes at least one of a preset data bearer identifier, logic channel information, Radio Link Control RLC configuration information, and packet data convergence protocol PDCP configuration information.

In a possible implementation, referring to FIG. 6B to FIG. 6F, the apparatus further includes: a first determining module 614, configured to: when the configuration information of the preset data bearer includes use condition information, determine whether a condition indicated in the use condition information is met, where the use condition information is used to indicate a condition that needs to be met by a mobile terminal that can use the preset data bearer. a first triggering module 616, configured to: when the condition indicated in the use condition information is met, trigger the transmission module 612 to perform any one of the foregoing step 204, step 304, and step 404.

In a possible implementation, the apparatus further includes: a determining module 618, configured to: when the configuration information of the preset data bearer includes a first mapping relationship, determine a data type of the data, where the first mapping relationship is a mapping relationship between a data type and a data bearer supporting the data type; a second determining module 60, configured to determine, based on the first mapping relationship, whether a data bearer corresponding to the data type of the data is the preset data bearer; and a second triggering module 622, configured to: when the data bearer corresponding to the data type of the data is the preset data bearer, trigger the transmission module 612 to perform any one of the foregoing step 204, step 304, and step 404.

In a possible implementation, the first receiving module 610 includes: a first receiving unit, configured to receive system information broadcast by a radio access network device, where the system information includes the configuration information of the preset data bearer. a second receiving unit, configured to: during establishment of the RRC connection, receive a specified message sent by the radio access network device, where the specified message carries the configuration information of the preset data bearer.

In a possible implementation, the specified message is a radio resource control (RRC) establishment message.

In a possible implementation, the apparatus further includes: an encryption module 624, configured to perform the first possible implementation of step 304 in the foregoing embodiment in FIG. 3.

In a possible implementation, the apparatus further includes: a third determining module 626, configured to: when the configuration information of the preset data bearer includes capacity indication information, determine whether a size of data that has been transmitted over the preset data bearer is greater than a maximum amount that is indicated in the capacity indication information and that is of uplink data; and a third triggering module 628, configured to: when the size of data that has been transmitted over the preset data bearer is greater than the maximum amount that is indicated in the capacity indication information and that is of uplink data, trigger the transmission module 612 to perform any one of the foregoing step 204, step 304, and step 404.

In a possible implementation, the apparatus further includes: a second receiving module 630, configured to perform any one of the foregoing step 207, step 307, and step 407; and a change module 632, configured to perform any one of the foregoing step 208, step 308, and step 408.

In this embodiment of this application, the configuration information that may be used to transmit data and that is of the preset data bearer is received. The configuration information includes the data transmission mode of data transmitted over the radio interface through the preset data bearer. Therefore, after the establishment of the radio resource control RRC connection is completed, the radio access network device can transmit data through the preset data bearer based on the configuration information. In this way, after the establishment of the RRC connection is completed, the mobile terminal can use the preset data bearer to transmit data, thereby avoiding that a plurality of signaling interactions are required before a data bearer can be established, so that a data transmission latency is reduced.

It should be noted that when the data transmission apparatus provided in the foregoing embodiments implements the data transmission method, the foregoing division of functional modules is only used as an example for description. During actual application, the foregoing functions may be allocated to be accomplished by different functional modules according to requirements. To be specific, the internal structure of the device is divided into different functional modules to accomplish all or some of the functions described above. In addition, the data transmission apparatus provided in the foregoing embodiments share the same concept with the embodiments of the data transmission method, and reference may be made to the method embodiments for the specific implementation process of the data transmission apparatus. Details are not described herein again.

A person of ordinary skill in the art may understand that all or some of the steps of the embodiments may be implemented by hardware or a program instructing related hardware. The program may be stored in a computer-readable storage medium. The storage medium may include a read-only memory, a magnetic disk, or an optical disc.

The foregoing descriptions are merely examples of embodiments of this application, but are not intended to limit this application. Any modification, equivalent replacement, or improvement made without departing from the spirit and principle of this application should fall within the protection scope of this application.

What is claimed is:

1. A method, comprising:
   determining, by a radio access network device, configuration information of a preset data bearer, wherein the preset data bearer is configured to transmit data, and the configuration information of the preset data bearer comprises:
   a data transmission mode of data transmitted over a radio interface through the preset data bearer; and
   use condition information, wherein the use condition information indicates a condition that is required to be met by a mobile terminal to use the preset data bearer, and the use condition comprises that the mobile terminal is subscribed to a first service and that the mobile terminal is a first type of mobile terminal; and
   before a process of establishing a radio resource control (RRC) connection to the mobile terminal is completed, sending, by the radio access network device, the configuration information of the preset data bearer to the mobile terminal, wherein sending the configuration information of the preset data bearer to the mobile terminal causes the mobile terminal to determine whether the mobile terminal meets the use condition, and when the mobile terminal determines it meets the use condition, the configuration information of the preset data bearer is used by the mobile terminal to transmit data through the preset data bearer.

2. The method according to claim 1, wherein the configuration information of the preset data bearer further comprises a preset data bearer identifier, logic channel information, Radio Link Control (RLC) configuration information, or packet data convergence protocol (PDCP) configuration information.

3. The method according to claim 1, wherein sending the configuration information of the preset data bearer to the mobile terminal comprises:
   broadcasting system information, wherein the system information comprises the configuration information of the preset data bearer; or
   during the process of establishing the RRC connection, adding the configuration information of the preset data bearer to a specified message sent to the mobile terminal.

4. The method according to claim 3, wherein the specified message is a radio resource control (RRC) establishment message.

5. A method, comprising:
   before a process of establishing a radio resource control (RRC) connection to a radio access network device is completed, receiving, by a mobile terminal, configuration information of a preset data bearer that is sent by the radio access network device, wherein the preset data bearer is configured to transmit data, the configuration information of the preset data bearer instructs to transmit data through the preset data bearer, and the configuration information of the preset data bearer comprises:
- a data transmission mode of data transmitted over a radio interface through the preset data bearer; and
- use condition information, wherein the use condition information indicates a condition that is required to be met by the mobile terminal to use the preset data bearer, and the use condition comprises that the mobile terminal is subscribed to a first service and that the mobile terminal is a first type of mobile terminal;

determining, by the mobile terminal, whether the mobile terminal meets the use condition; and after the process of establishing the RRC connection to the radio access network device is completed, and in response to determining that the mobile terminal meets the use condition, transmitting data, by the mobile terminal, through the preset data bearer based on the configuration information of the preset data bearer.

6. The method according to claim 5, wherein the configuration information of the preset data bearer further comprises a preset data bearer identifier, logic channel information, Radio Link Control (RLC) configuration information, or packet data convergence protocol (PDCP) configuration information.

7. The method according to claim 5, wherein receiving the configuration information of the preset data bearer that is sent by the radio access network device comprises:
- receiving system information broadcast by the radio access network device, wherein the system information comprises the configuration information of the preset data bearer; or
- during the process of establishing the RRC connection, receiving a specified message sent by the radio access network device, wherein the specified message carries the configuration information of the preset data bearer.

8. An apparatus, comprising:
a transmitter;
a receiver; and
a processor;
wherein the transmitter, and the receiver are connected to the processor, and the processor is used to invoke program code to cause a radio access network device to:
- determine configuration information of a preset data bearer, wherein the preset data bearer is configured to transmit data, and the configuration information of the preset data bearer comprises:
  - a data transmission mode of data transmitted over a radio interface through the preset data bearer; and
  - use condition information, wherein the use condition information indicates a condition that is required to be met by a mobile terminal to use the preset data bearer, and the use condition comprises that the mobile terminal is subscribed to a first service and that the mobile terminal is a first type of mobile terminal; and
- before a process of establishing a radio resource control (RRC) connection to the mobile terminal is completed, send the configuration information of the preset data bearer to the mobile terminal, wherein sending the configuration information of the preset data bearer to the mobile terminal causes the mobile terminal to determine whether the mobile terminal meets the use condition, and when the mobile terminal determines it meets the use condition, the configuration information of the preset data bearer is used by the mobile terminal to transmit data through the preset data bearer.

9. The apparatus according to claim 8, wherein the configuration information of the preset data bearer further comprises a preset data bearer identifier, logic channel information, Radio Link Control (RLC) configuration information, or packet data convergence protocol (PDCP) configuration information.

10. The apparatus according to claim 8, wherein sending the configuration information of the preset data bearer to the mobile terminal comprises:
- broadcasting system information, wherein the system information comprises the configuration information of the preset data bearer; or
- during the process of establishing of the RRC connection to the mobile terminal, adding the configuration information of the preset data bearer to a specified message sent to the mobile terminal.

11. The apparatus according to claim 10, wherein the specified message is a radio resource control (RRC) establishment message.

12. An apparatus, comprising:
a transmitter;
a receiver; and
a processor;
wherein the transmitter, and the receiver are connected to the processor, and the processor is configured to invoke program code to cause a mobile terminal to:
- before a process of establishing a radio resource control (RRC) connection to a radio access network device is completed, receive configuration information of a preset data bearer that is sent by the radio access network device, wherein the preset data bearer is configured to transmit data, the configuration information of the preset data bearer instructs to transmit data through the preset data bearer, and the configuration information of the preset data bearer comprises:
  - a data transmission mode of data transmitted over a radio interface through the preset data bearer; and
  - use condition information, wherein the use condition information indicates a condition that is required to be met by the apparatus to use the preset data bearer, and the use condition comprises that the apparatus is subscribed to a first service and that the apparatus is a first type of apparatus;
- determining whether the mobile terminal meets the use condition; and
- after the process of establishing the RRC connection to the radio access network device is completed, and in response to determining the mobile terminal meets the use condition, transmitting data through the preset data bearer based on the configuration information of the preset data bearer.

13. The apparatus according to claim 12, wherein the configuration information of the preset data bearer further comprises a preset data bearer identifier, logic channel information, Radio Link Control (RLC) configuration information, and packet data convergence protocol (PDCP) configuration information.

14. The apparatus according to claim 12, wherein receiving the configuration information of the preset data bearer that is sent by the radio access network device comprises:

receiving system information broadcast by the radio access network device, wherein the system information comprises the configuration information of the preset data bearer; or during the process of establishing the RRC connection to the radio access network device, receiving a specified message sent by the radio access network device, wherein the specified message carries the configuration information of the preset data bearer.

\* \* \* \* \*